(12) United States Patent
Johnsson et al.

(10) Patent No.: US 8,724,503 B2
(45) Date of Patent: May 13, 2014

(54) SUB-PATH E2E PROBING

(75) Inventors: Andreas Johnsson, Uppsala (SE); Svante Ekelin, Vallentuna (SE); Chistofer Flinta, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 13/583,857

(22) PCT Filed: Mar. 10, 2010

(86) PCT No.: PCT/SE2010/050271
§ 371 (c)(1),
(2), (4) Date: Nov. 19, 2012

(87) PCT Pub. No.: WO2011/112126
PCT Pub. Date: Sep. 15, 2011

(65) Prior Publication Data
US 2013/0058235 A1 Mar. 7, 2013

(51) Int. Cl.
*H04J 1/16* (2006.01)
(52) U.S. Cl.
USPC .......................................... 370/252; 370/230
(58) Field of Classification Search
USPC ......... 370/229, 230, 235, 392, 389, 252, 254, 370/231, 248, 241
See application file for complete search history.

(56) References Cited

U.S. PATENT DOCUMENTS

| 7,583,667 B2 * | 9/2009 | Adhikari et al. | 370/389 |
|---|---|---|---|
| 2005/0207410 A1 * | 9/2005 | Adhikari et al. | 370/389 |
| 2006/0215572 A1 * | 9/2006 | Padhye et al. | 370/252 |
| 2009/0016238 A1 | 1/2009 | Yu | |
| 2010/0157834 A1 * | 6/2010 | Keromytis et al. | 370/252 |
| 2011/0176429 A1 * | 7/2011 | Johnsson et al. | 370/241 |
| 2011/0299406 A1 * | 12/2011 | Vobbilisetty et al. | 370/248 |

FOREIGN PATENT DOCUMENTS

| EP | 1 705 834 A1 | 9/2006 |
|---|---|---|
| WO | 2010033059 A1 | 3/2010 |

OTHER PUBLICATIONS

A. Pasztor et al. "Active Probing using Packet Quartets" Proceedings of the 2nd Internet Measurement Workshop (IMW 2002), 7 pages.
V. Ribeiro at al. "Locating Available Bandwidth Bottlenecks" IEEE Internet Computing, Sep. 2004, pp. 34-41.
S. Shioda et al, "A New Approach to the Bottleneck Bandwidth Measurement for an End-to-End Network Path" IEEE, 2005, pp. 59-64.
A. Johnsson et al. "A scheme for measuring subpath available bandwidth" The 4th IEEE LCN Workshop on Network Measurements (WNM 2009), Zurich, Switzerland; Oct. 20-23, 2009, pp. 1095-1101.

* cited by examiner

*Primary Examiner* — Abdullah Riyami
(74) *Attorney, Agent, or Firm* — Rothwell, Figg, Ernst & Manbeck, P.C.

(57) ABSTRACT

The present invention relates to a method and arrangement for estimating available bandwidth of sub-path of a data path. The solution is based on the sending of probe packet trains comprising inner and outer packets from a start node to an end node using different TTL values for the outer and inner packets of these probe trains. By comparing measurements using different TTL values of the inner packets, it is also possible to determine which link are the local tight link and what available bandwidth it has.

15 Claims, 7 Drawing Sheets

| TTL_inner | Subpath | Avail. BW | Capacity |
|---|---|---|---|
| 1 | $P(R_0,R_1)$ | 68 | 122 |
| 2 | $P(R_0,R_2)$ | 73 | 110 |
| 3 | $P(R_0,R_3)$ | 70 | 127 |
| 4 | $P(R_0,R_4)$ | 73 | 120 |
| 5 | $P(R_0,R_5)$ | 70 | 125 |
| 6 | $P(R_0,R_6)$ | 69 | 130 |
| 7 | $P(R_0,R_7)$ | 71 | 121 |
| 8 | $P(R_0,R_8)$ | 70 | 120 |
| 9 | $P(R_0,R_9)$ | 71 | 99 |
| 10 | $P(R_0,R_{10})$ | 57 | 86 |
| 11 | $P(R_0,R_{11})$ | 57 | 94 |

Fig. 8

SUB-PATH E2E PROBING

CROSS REFERENCE TO RELATED APPLICATION(S)

This application is a 35 U.S.C. §371 National Phase Entry Application from PCT/SE2010/050271, filed Mar. 10, 2010, designating the United States, the disclosure of which is incorporated herein in its entirety by reference.

TECHNICAL FIELD

The invention relates generally to monitoring data paths in communication networks, particularly a method and an arrangement for estimating a data path condition.

BACKGROUND

A packet switched data network such as the Internet can be considered to comprise a mass of nodes interconnected by data paths.

In packet switched data networks such as the Internet, monitoring a data path, or in other words, estimating a condition such as available bandwidth end-to-end over a data path of the network is useful in several contexts; including Service Level Agreement (SLA) verification, network monitoring and server selection.

Mainly, there are two ways to estimate a condition such as available bandwidth, namely passive or active monitoring.

Passive monitoring of available bandwidth of an end-to-end data path requires that all of the network nodes in the network path can be accessed. However, this is typically not possible. Therefore, measuring available end-to-end bandwidth is typically done by active probing of the data path. The available bandwidth can be estimated by transmitting probe traffic, such as User Data Protocol (UDP) probe packets including a train of probe packets into the data path, and then analyzing the observed effects of other data packet communications, here denoted, cross traffic on the probe packets. Typically, large UDP probe packets having a specified inter-packet separation are transmitted. This kind of active measurement requires access to both sender and receiver hosts, referred to as sender and receiver nodes, but does not require access to any intermediate node(s) in the path between the sender and receiver nodes. Conventional approaches to active probing require the transmission of probe packet traffic into the data path of interest at a rate that is sufficient transiently to use all available bandwidth and cause congestion. If only a small number of probe packets are used, then the induced transient congestion can be absorbed by buffer queues in the nodes. Accordingly, no data packet loss is caused, but rather only a small data path delay increase of a few data packets. The desired measure of the available bandwidth is determined based on the increase in delay due to the probe packets having experienced congestion between sender and receiver node. The probe packet rate where the data path delay begins increasing corresponds to the point of congestion, and thus is indicative of the available bandwidth.

The current methods give only an estimate of the available bandwidth for the whole network path between the sender and the receiver, but no information on the available bandwidth of the links in the path. In other words, these methods lack a finer resolution at link or sub-path level.

SUMMARY

One object of the present invention is to provide a solution to the problem to determine the available bandwidth for sub-paths between a start node and an end node of a data path.

The solution is based on the sending of probe packet trains comprising inner and outer packets from the start node to the end node using different TTL values for the outer and inner packets of these probe trains in order to determine the available bandwidth of sub-paths of a.

By comparing measurements using different TTL values of the inner packets, it is also possible to determine which link are the local tight link and what available bandwidth it has.

According to one aspect of the present invention, a method is provided by which it is possible to estimate the available bandwidth of sub-paths of a data path between a start node and an end node in a communications network. Said data path is comprising a number of links connecting said start node with the end node via a number of intermediate nodes, each node is constituting a hop and each link is having an available bandwidth during operation of said network. In the method, probe trains are generated and transmitted towards the end node. Each probe train is generated with a specific size and an initial inter-packet separation, IPSsent, and the probe train comprises outer and inner data packets. An outer Time-To-Live, TTL_outer, value of the outer data packets is set equal to or higher than the number of hops to the end node and an inner Time-To-Live, TTL_inner, value of inner data packets to a value equal to or less than the TTL_outer value, wherein TTL_inner value is defining a sub-path. After reception at the end node, the sent probe train's received inter-packet separation IPSreceived is determined, which determination may be performed in connection to the end node or to the start node, in accordance to different embodiments of the invention. A calculating step is performed for calculating an estimate for available bandwidth, B, for the used TTL_inner value, said estimate is calculated based on the initial train size and a difference between the IPSsent and the received IPSreceived inter-packet separations. By repeating the steps of the method for different TTL_inner values a number of times, new probe trains are generated and the available bandwidth for a number of sub-paths are estimated.

According to further one aspect of the present invention, an arrangement is provided for estimating the available bandwidth of sub-paths of a data path between a start node and an end node in a communications network. Said data path comprising a number of links connecting said start node with the end node via a number of intermediate nodes, each node is constituting a hop and each link is having an available bandwidth during operation of said network. The arrangement is comprising a sender unit configured to generate and transmit a probe train towards the end node. Said probe train is generated with a specific size and an initial inter-packet separation IPSsent, and it comprises outer and inner data packets. The outer data packets are enclosing the inner data packets. A Time-To-Live, TTL_outer, value of the outer data packets is set equal to or higher than the number of hops to the end node, and an inner Time-To-Live, TTL_inner, value of inner data packets is set to a value equal to or less than the TTL_outer value. Said TTL_inner value is defining a sub-path of the data path. Further, a receiver unit is provided, which is adapted for determining the probe train's received inter-packet separation, IPS received. The arrangement is also provided with an estimator unit, which calculates an estimate for available bandwidth for the TTL_inner value defining the sub-path. Said estimate is calculated based on the initial train size and a difference between the initial IPSsent and the received IPSreceived inter-packet separations.

Further embodiments of the present invention are provided by the dependent claims.

The present invention has a number of advantages over prior art.

With this invention it is possible to get estimates of available bandwidth and tight link capacity for sub-paths starting from a sender and ending at each router up to a destination address.

Assuming that the link capacities and the traffic in the path vary slowly over time, it is also possible to deduce which link in sequence is the tight link and get the estimates for this link.

It may also be possible to find other local tight links of the path or at least estimates of available bandwidth of links upstream of the tight link.

Furthermore, one version of the invention makes it possible to monitor these estimates even without any receiver at the destination address.

BRIEF DESCRIPTION OF THE DRAWINGS

The foregoing, and other, objects, features and advantages of the present invention will be more readily understood upon reading the following detailed description in conjunction with the drawings in which:

FIG. 8 is a table comprising the result of running the sub-path probing test;

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced and other embodiments that depart from these specific details. In other instances, detailed descriptions of well known methods, devices, and circuits are omitted so as not to obscure the description of the present invention with unnecessary detail.

Figure 1:
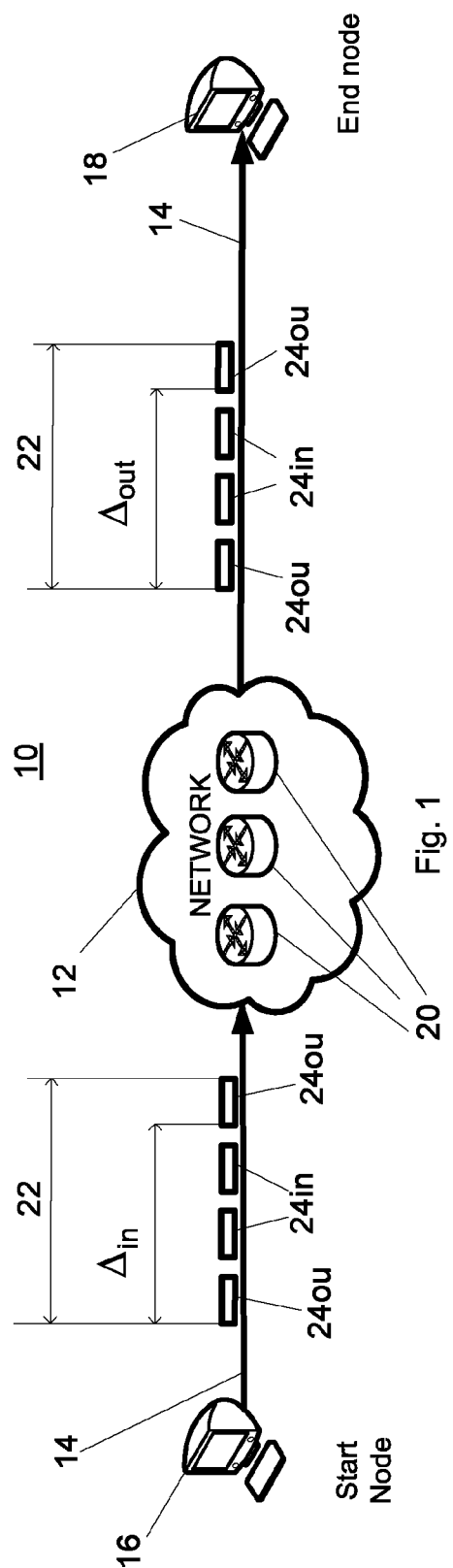
FIG. 1 is a block diagram of an exemplary network in which arrangements and methods described herein may be implemented.
Figure 2:
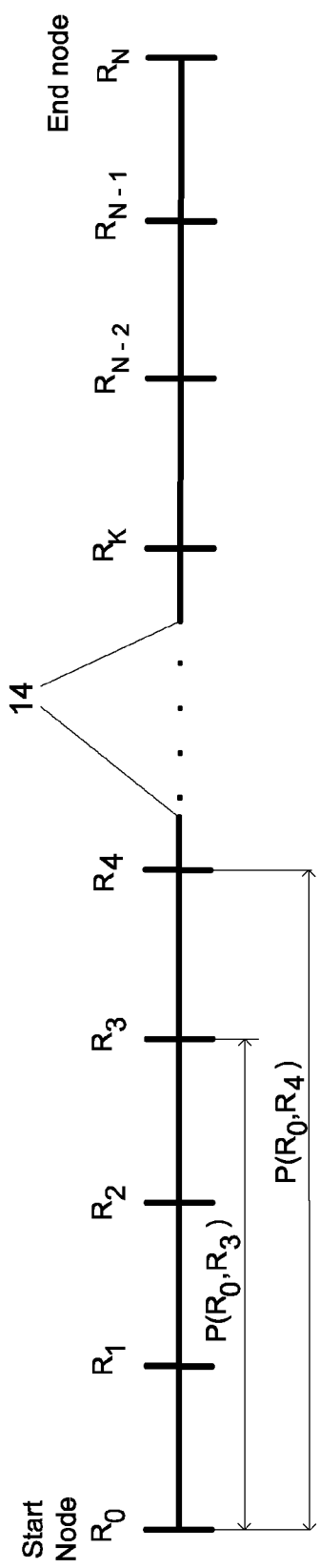
FIG. 2 is a block diagram illustrating a data path and sub-paths thereof.

FIG. 1 is a network system in which arrangements and methods described herein may be implemented. The network system 10 comprises a start node and an end node connected via a communications network 12, e.g. a packet switched data network such as the Internet. In said network system, a data path 14 is established between said start node, in which a data equipment 16, e.g. a computer system, router, etc, is located and an end node, in which a second user equipment 18, e.g. another or similar computer system, is located. Data packets addressed to said end node is sent via said data path 14 in which a number of routers 20 is directing the data packets towards the end node by means of the IP address in the data packets. Each router 20 is located in an intermediate node $R_K$, K=1, 2, 3, . . . , N−2, N−1, as illustrated in FIG. 2. The intermediate nodes are connected via data links, or links, which together constitutes the data path between the start node $R_0$ and the end node $R_N$.

Definition of Sub-Paths

FIG. 2 is an illustration of a data path comprising start node $R_0$, the intermediate nodes $R_K$, K=1, 2, 3, . . . , K, N−2, N−1 and the end node $R_N$.

The data path 14 may also be denoted as a path $P(R_0, R_N)$, which is defined as a sequence of network nodes $R_0, \ldots R_N$. In the case of an end-to-end path, $R_0$ corresponds to the start node and $R_N$ to the end node. $R_k$ corresponds to node number K on the path $P(R_0, R_N)$. Generally, the sub-path $P(R_i, R_K)$ denotes the path from $R_i$ to $R_K$. A link $L(R_1,R_2)$ between the nodes $R_1$ and $R_2$ is then similar with the sub-path $P(R_1,R_2)$.

In FIG. 2, two sub-paths are given as example. One sub-path $P(R_0,R_3)$ comprising the links between the start node $R_0$, and the intermediate nodes $R_1$, $R_2$ and $R_3$. Further one sub-path is given, the sub-path $P(R_0,R_4)$. The link $L(R_3,R_4)$ is then the difference between the two sub-paths. If there is a difference in the detected path conditions of the two sub-sequent sub-paths, said difference is most likely depending on the link $L(R_3,R_4)$.

Thus, said data path 14 comprises a number of links connecting said start node with the end node via a number of intermediate nodes $(R_1, \ldots, R_{N-1})$, each node is constituting a node hop, even denoted router hop or hop. Each link is having an available bandwidth $B_{link}$ during operation of said network.

The concept of self-induced congestion is to inject probe packets at a specified rate at one endpoint and then observe the changes in the rate at another endpoint. By analyzing probe traffic being transferred from one node to another node, the available bandwidth may be estimated.

The so called probing is illustrated in FIG. 1. A probe packet train 22 is sent with an initial probe bit rate $u_1$. In this example, the probe packet train involves four data packets 24, two outer packets 24*ou*, first and last in the train, and between the outer packets two inner packets 24*in*. Of course, a train may comprise more than two inner packets. If the probe packet train size is s [bits] and the time dispersion is Δin [time unit; s], herein also denoted inter-packet separation IPSsent [time unit; s], said parameters have the following relation $$u_1 = s/\Delta\text{in}$$

If probe rate is higher than the available bandwidth B in any of the links of the data path the packets will congest the at least one link in the path momentarily and thereby they will on average be received at a reduced rate u2. This is equivalent to that the time dispersion at the sender side, Δin, is smaller than the time dispersion at the receiver, Δout. Thus, $$u_2 = s/\Delta\text{out}$$

if no packet loss has occurred during the transfer.

It is possible to define the ratio inter-packet strain $$\epsilon = (\Delta\text{out} - \Delta\text{in})/\Delta\text{in}$$

On the other hand, if the probe rate is lower than the available bandwidth, there is no congestion and so on average no extended time dispersion, that is $\epsilon=0$.

BART and pathChirp are two examples of methods utilizing self-induced congestion that also are capable of providing available bandwidth estimates in real time. By sending probe packets between two endpoints the end-to-end available bandwidth is estimated by means of various statistical methods where Δout is compared to Δin.

Defining Available Bandwidth

Figure 3:
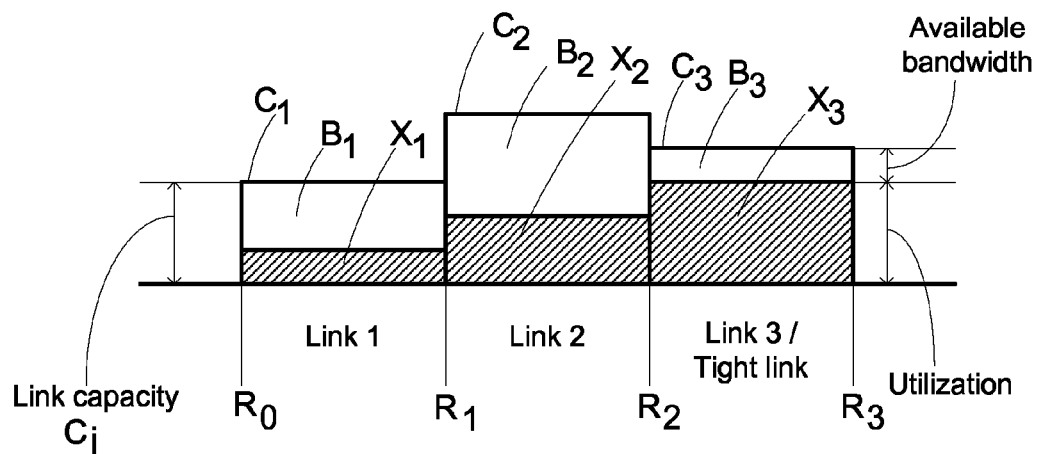
FIG. 3 is a diagram for illustrating the concepts of the performance parameters capacity, utilization and available bandwidth.

FIG. 3 is a diagram for illustrating the concepts of the performance parameters capacity, utilization and available bandwidth.

The sub-path $P(R_0.R_3)$ involving three links that are part of the network path illustrated in FIG. 2 will now be discussed. Each link has a constant capacity that defines the maximum rate at which IP traffic can be sent. At any given point in time the links are utilized to some degree by IP traffic, this is exemplified by the shaded area in each box. Then, for each link the available bandwidth is calculated as the difference between the link capacity and the utilization.

By means of an analyze algorithm, e.g. BART, the available bandwidth of the link with the least available bandwidth of the data path is estimated. This defines the path available bandwidth. Further, with BART it is possible to estimate the tight link capacity which is the capacity of the link defining the path available bandwidth. The path available bandwidth and tight link capacity is illustrated as Link 3 in the figure.

As already discussed briefly, in some embodiments of the invention, for example, the condition to be estimated is the available bandwidth of the network path. The concept of available bandwidth can be understood as follows. Each link j in a network path has a certain capacity, $C_j$, determined by the network interfaces in the nodes on each end of the link. The capacity $C_j$ is simply the highest possible bit rate over the link at the packet level. The capacity typically does not vary over short time scales. However, the load, even denoted utilization or cross traffic, on a given link j, denoted by $X_j(t)$, does vary. The available bandwidth $B_j(t)$ of link j is $B_j(t)=C_j-X_j(t)$. One of links j along the path has the smallest available bandwidth. This "bottleneck link" determines the available bandwidth of the path. The available bandwidth $B(t)$ of a network path is the minimum of the available bandwidths respectively associated with its constituent links:

$$B(t)=\min(C_j-X_j(t)).$$

The available bandwidth of a network path at any time t can thus be interpreted as the maximum increase in data rate, from sending end to receiving end, which can theoretically occur at time t without causing congestion. It should be noted that cross traffic load and thus available bandwidth are defined using some averaging time scale T, i.e. $X_j(t)$ is calculated by averaging over some time interval of length T around time t. There is no universal, natural choice of T, rather this depends on the specifics of the application. Due to finite link capacity and cross-traffic packet size, T may not be chosen arbitrarily small. However, for modern data networks, available bandwidth and cross traffic load could be defined using T as low as in the sub-second region.

Relation Inter-Packet Strain and Probe Rate

Figure 4:
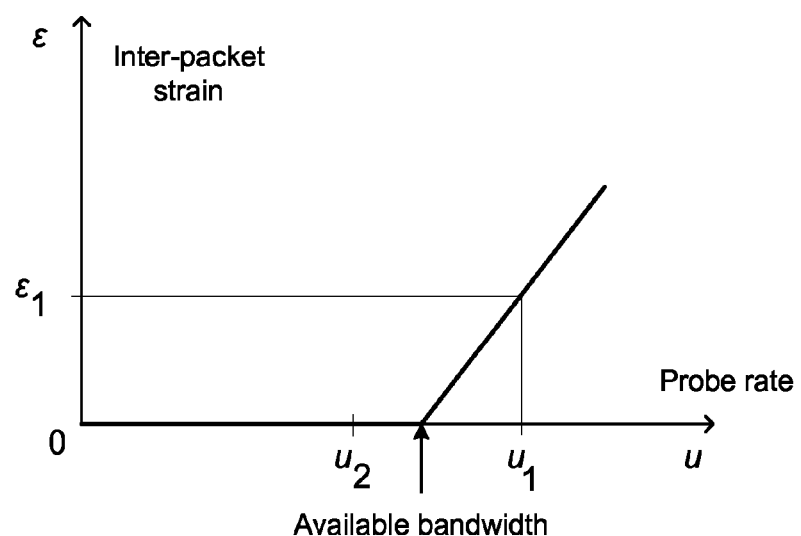
FIG. 4 is a diagram illustrating the asymptotic relation between available bandwidth B, probe intensity u and expectation value of inter-packet strain E.

FIG. 4 is a diagram illustrating the asymptotic relation between available bandwidth B, probe rate u and expectation value of inter-packet strain $\epsilon$.

In the following, a model of a network path from a sender to a receiver will be described. The network path is considered to consist of a number of a succession of concatenated hops. A hop consists of an input queue and a transmission link. The queues are assumed to be First-in First-out, FIFO, queues. Each hop j has a capacity $C_j$ and carries a time-varying cross traffic $X_j$. Of special interest is the interactions between the regular traffic cross traffic $X_j$ and the injected probe traffic u in order to arrive at a formalism which allows analyzing the effect that cross traffic $X_j$.

First, consider a single hop with link capacity C and cross traffic X. The available bandwidth is then C−X. Assume that the link is also subject to probe traffic demand at a rate u. If u≤C−X there is no congestion and the received probe traffic rate r exiting the link is the same as the demand probe rate u. However, in the case u>C−X, an overload situation is present. It is assumed that the cross traffic and the probe traffic each receive their proportionate share of the link capacity C.

The received probe traffic rate may be described as:

$$r = \frac{u}{u+X}C$$

Expressed as a first-order polynomial:

$$\frac{u}{r} = \frac{1}{C}u + \frac{X}{C}$$

$$\frac{u}{r} = \begin{cases} 1 & (u \leq C-X) \\ \frac{1}{C}u + \frac{X}{C} & (u > C-X) \end{cases}$$

Thus, by varying u and trying to identify the point where u/r starts to deviate from unity, a way of estimating the available bandwidth of the link. By repeating this argument for several concatenated links, the available bandwidth for the entire path from sender to receiver can be estimated by studying the ratio of offered probe rate at the sender to received probe rate at the receiver, and determining the point where this ratio starts deviating from unity. This value of u is the estimate of the available bandwidth B of the entire path.

Note that when one estimates the parameters of the straight line, one simultaneously also gets an estimate of the bottleneck link C, as this is the inverse of the slope.

Now, considering the discrete (packet-oriented) nature of network traffic, it is necessary to adapt the above reasoning to take into account the fact that the traffic is not a continuous flow, but is composed of discrete packets.

Considering a sequence of packet pairs, where the two packets in pair i arrive at a hop at times $\tau i_1$ and $\tau i_2$ and depart (i.e. arrive at the next hop) at times $\tau i^*_1$ and $\tau i^*_2$. We are not interested in the absolute arrival times, but rather the inter arrival times of the packets in pair i:

$$t_i = \tau_{i2} - \tau_{i1}$$

$$t^*_i = \tau^*_{i2} - \tau^*_{i1}$$

The dimensionless quantity inter-packet strain $\epsilon_i$, as $$1 + \epsilon_i = \frac{t^*_i}{t_i}$$

The strain can be expressed in terms of the delay variation as $$\epsilon_i = \frac{\delta_i}{t_i},$$

where $\delta_i = t^*_i - t_i$.

The strain provides a direct analogy in the discrete description to the model ratio of demanded to received traffic rate discussed above. With packet size s, at the time resolution of inter-packet time separation level, demanded traffic rate is $u=s/t_i$ and for the received traffic rate $r=s/t^*i$, which gives $$\frac{u}{r} = \frac{s/t_i}{s/t_i^*} = \frac{t_i^*}{t_i} = 1+\varepsilon_i$$

The deviation of u/r from unity is equivalent to the deviation of the strain $\varepsilon$ from zero, see FIG. 4. No strain means no congestion.

It should be noted that when going beyond the model and taking packet-level interactions in router queues into account, the system measurement model curve is expected to deviate somewhat from the form in FIG. 4. However, the asymptotic behavior is a sloping straight line, which is the main point of interest here. The deviation from this straight line is taken care of by a noise term in our approach.

Input data for an adapted estimation algorithm, e.g. BART, etc, is generated by sending sequences of N probe packet trains with the same internal traffic rate u.

In the model, observation of the inter-packet strain over the path gives a handle on estimating the available bandwidth for the tight link, and consequently the available bandwidth of the entire path. It is assumed, that for the average inter-packet strain of consecutive probe packet pairs is a sequence of a given rate u, any systematic deviation from zero is dominated by the effect of cross traffic interaction in the FIFO queue at the bottleneck link.

Thus, by means of the known methods, it has been possible to estimate the available bandwidth for the tight link, and consequently the available bandwidth of the entire path. However, it has not been possible to determine which of the links that is the tight link. In the following, different embodiments of present invention will be described for determining said bottleneck link, i.e. tight link.

In FIG. 4, two probe traffic intensities $u_1$ and $u_2$ are illustrated, wherein $u_1>u_2$. As $u_1$ also is higher than the available bandwidth B, a hop with the available bandwidth B will cause an inter-packet strain $\varepsilon_1$ on a probe packet train passing said hop. A probe packet train having traffic intensities $u_2$, which is less than the available bandwidth B, the inter-packet strain $\varepsilon=0$, i.e. the hop will not add any time dispersion to the probe train.

Generally, the method according the present invention may use a sender unit and a receiver unit. The sender unit sends probe packet trains comprising inner data packets and outer data packets to the receiver with a fixed time dispersion between the first and the last packet, corresponding to a specific probe rate. This is repeated for varying probe rates. If the probe rate of the train is higher than the available bandwidth at some link in the path, the time dispersion at the receiver side will be larger than the time dispersion at the sender side.

The invention is based upon that the sender sends each probe packet train to the receiver with a high Time-To-Live, TTL, value in the first and last packet and a low TTL value in the inner packets. If the TTL value of the inner packets is lower than the number of router hops in the path, these inner packets will be discarded. The TTL value determines which router will drop the packets, e.g. TLL=3 will force the router which is three hops downstream the sender to drop these packets.

The method is based on the following assumptions:

If the TTL value of the first and the last packet of the train is higher than the number of hops in the network path, they will continue to the receiver.

If the number of packets in the train is sufficiently high, the time dispersion between the first and the last packet at the dropping router will be large enough (i.e. the corresponding probe rate small enough) not to cause any congestion at the subsequent router hops. In this case the time dispersion at the dropping router will be preserved all the way to the receiver, apart form some random noise. The receiver time dispersion will thus be same as the time dispersion at the dropping router plus some noise.

At the receiver, the packets that were not discarded on the path will be time stamped and the receiver can then calculate the time dispersion for the whole train. Using this value and the sender time dispersion for the train, a mathematical algorithm and/or method, e.g. the known BART (Bandwidth Available in Real Time) method can calculate an estimate of the end-to-end available bandwidth and tight link capacity.

Since the inner packets are dropped by different routers, each TTL value of the inner packets will assign an estimate to a corresponding sub-path $P(R_0, R_{TTL})$, where $R_{TTL}$ denotes the router at TTL hops from the sender. For example, when TTL=1 the estimates at the receiver side refer to the sub-path $P(R_0, R_1)$, i.e. the sub-path between the sender and the first router in the path. When TTL=2 the estimates refer to the sub-path $P(R_0, R_2)$, i.e. the sub-path between the sender and the second router in the path. Using all TTL values up to the number of hops in the path it is possible to get estimates for all the sub-paths from the sender to each one of the routers.

The send times, receive times, packet size and number of packets in the train, are used as input for calculating an estimate of the available bandwidth and optionally tight link capacity for the sub-path $P(R_0, R_{TTL\_INNER})$, using e.g. BART. The BART method, see reference [1], also provides an estimate of the tight link capacity in the network path, but cannot tell which link it refers to.

The estimation is typically produced by means of an analysis algorithm based on probe rate methods and are known per se. Examples of such algorithms that could be employed are: Bandwidth Available in Real Time (BART) presented in reference [1], pathChirp presented in reference [2], Pathload presented in reference [3] or Spruce presented in reference [4]. These are also described in a number of other prior art documents, such as U.S. patent application Ser. No. 11/285, 723 (Ekelin et al) describing BART.

In the following, different embodiment of a method according to present invention will be presented.

Figure 5:
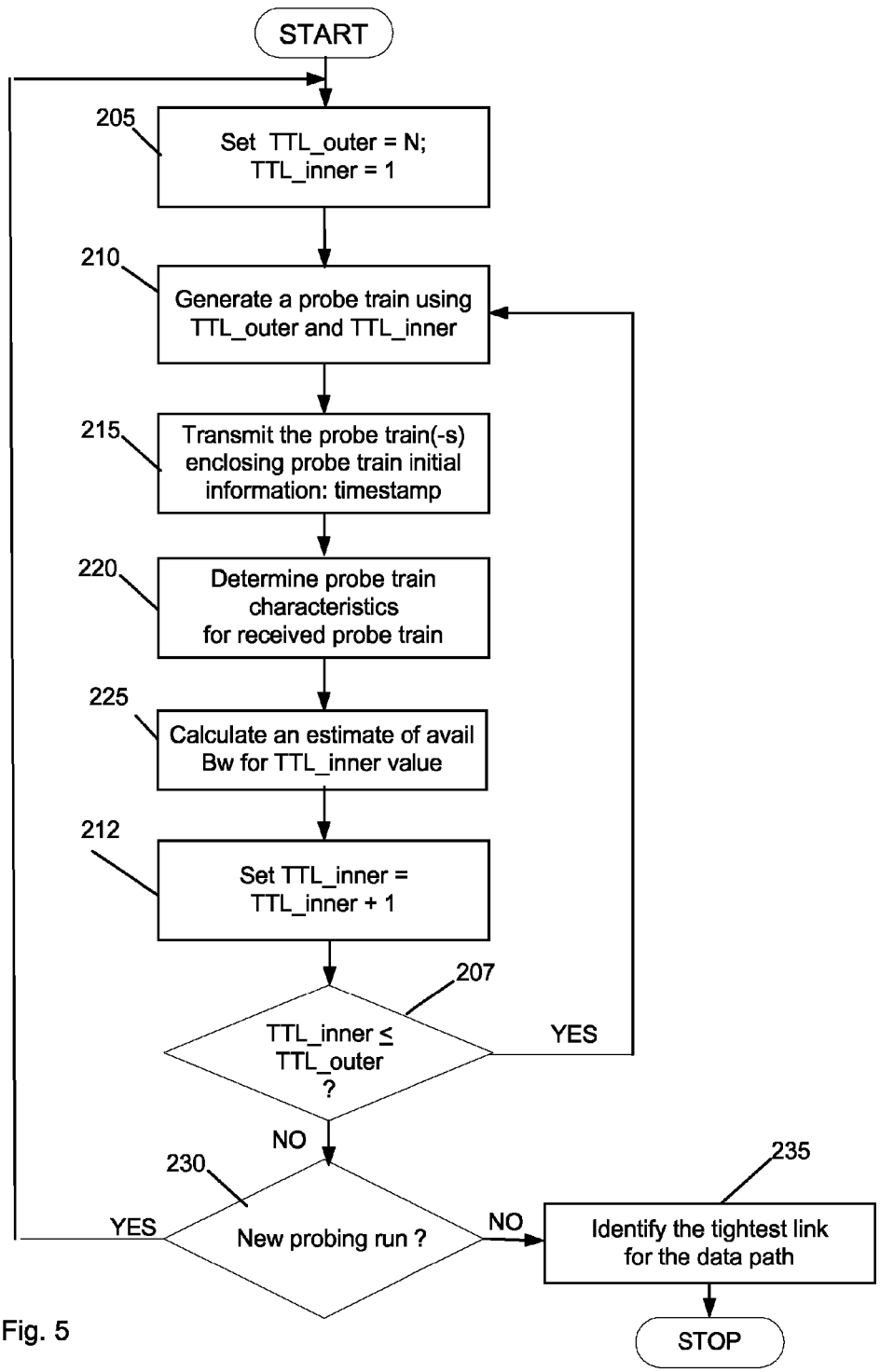
FIG. 5 is flowchart illustrating one embodiment of the present invention.

FIG. 5 is a flowchart illustrating one of a number of embodiments of the method for estimating the available bandwidth of-sub-paths of a data path between a start node ($R_0$) and an end node ($R_N$) in a communications network. Said data path is comprising a number of links connecting said start node with the end node via a number of intermediate nodes ($R_1, \ldots, R_{N-1}$), each node is constituting a hop and each link is having an available bandwidth during operation of said network. The method may be implemented as computer program software or hardware, or a combination of software and hardware, to be stored in and executed by any computer, CPU, microprocessor, etc. The method may be implemented in a computer in one node or partly distributed to a number of computers in different nodes.

In the following described embodiment of the invention, the method will be distributed to three node entities, one sender entity in a start node, and a receiver entity and an estimator entity in an end node. Thus, the method according the described embodiment may be considered to comprise a number of sub-processes executed in different units by means of computers in different locations. A first sub-process may as an example be performed in the start node, a second and third sub-process in the end node.

A first sub-process of the present embodiment according to the invention is performed in the start node $R_0$. Said sub-process comprises a number of steps which now will be described and discussed in more detail.

In a start up step, 205, all the necessary start information for running the sub-path probing process for estimating the available bandwidth for sub-paths is retrieved in a suitable manner. All or some of the start information comprising input data, e.g. values for physical and electrical parameters, may be pre-set or predetermined, which could be retrieved from electronic data storage entities in the start node. All or some of the start information may also be retrieved by means of interactive man-machine interface for facilitating for a user to input suitable data. The start information may involve probe train initial information for defining the probe packet train to be used in a probing test of a data path. The number of packets in the train has to be defined. From this information the system is configured to generate the correct number of packets in the probe train, packet number index of the packets and identify the first and the last packet as outer packets, which will be assigned a TTL_outer value. TTL_outer is either chosen to the number of hops to the end node, in this described embodiment set to N, or an arbitrary high number that essentially exceeds the number of hops to the end node. For example, the highest TTL_outer value that is possible to set in an IPv4 packet is 255. Packets having intermediate numbers are automatically identified as inner packets, which will be assigned a TTL_inner value during the probing of different sub-paths. In the following, TTL_inner will automatically be assigned the value "1" from start. However, in other embodiments the TTL_inner value may be selected and set to another suitable and/or arbitrary start value. Further, initial information parameters may be the inter-packet separation, IPSsent, probe train rate u and train (and/or data packet) size s of the probe packet trains to be generated and sent as information in the probe train, i.e. in one or more packets.

As an example, by setting a probe rate u value, the parameters IPSsent, and train size s, could be determined by the equation u=s/IPSsent. It is possible to perform a number of initial end-to-end probing for the data path to find the combination of these parameters that achieve a difference between IPSsent and IPSreceived for a probe train received in an end node $R_N$.

In this embodiment, User Data Protocol UDP packets are used, but other packets or frames according to other protocols may be used. As an example, in the IP header is a field defined as Time-To-Live TTL in IPv4. The same field is defined as hop limit in IPv6. In this description, TTL is used for denoting the corresponding fields regardless if the packets are defined according to IPv4 or 6.

During a packet's transfer to the end node, the TTL_value will be decreased by the value "1" for each hop, as the routers in each node that a packet passes are configured by standard to read the TTL value, subtract the value with "1", and write the new lower TTL value into the TTL field before sending it forward along the data path. This will result in that the inner packets having TTL_inner=1 when arriving to a router will be dropped and not forwarded. A probe train having a probe rate $u_1$ when arriving to an intermediate node will continue with a lower probe train intensity $u_2$ on the following links after the loss of one or more packets. As illustrated in connection with FIG. 4, with a lower probe rate the probe train may continue to the end node without exceeding the available bandwidth of the following links and therefore without any further interference resulting in additional probe train strain. The TTL_inner value is therefore said to define the sub-path of the data path up to the intermediate node where the inner packets are stopped and dropped. After that, the probe train's traffic intensity u is too low for being affected by the available bandwidths of the following links.

By increasing the TTL_inner value in this way for each consecutive train, the inner packets will survive further one node, one by one, and for each new train, a new sub-path will be probed. With increasing TTL_inner value, the length of the sub-paths will increase. Thus, the length of a sub-path is shorter than the length of the adjacent following sub-path. By increasing the TTL_inner values up to the last hop to the end node $R_N$, i.e. up to N hops, the whole path will be probed sub-path for sub-path.

After the start-up step, 205, the first sub-process continues with the generating step, 210, wherein the initial information is used to create and configure the probe packet train, and provide it with information in the packet header and payload.

In the generating step, 210, the outer packets, i.e. the first and last packets of the train, are provided with their TTL_outer value, the total number of hops of a path "N", from the predetermined initial information and the inner, intermediate packets are provided with the start value, here "1", when the first train is generated. The consecutive generated probe trains will get the same TTL_outer value. i.e. "N", as the first generated train, but the TTL_inner value will be increased with "1" for each new generated train in a TTL_inner value setting step, 212. In other embodiments of the present invention, an other value than "+1" may be selected for step wise increment of the TTL_inner value.

The sub-process is provided with a condition test in step 207, checking if the present set TTL_inner value is less than or equal to the set TTL_outer value. As long as the condition is fulfilled the generation of a new probe train will continue. Thus, the object of the checking test 207 is to limit the number of generated probe trains.

The generation of probe trains and the sending of probe trains are quiet closely related. In the generation step, 210, the trains are generated one by one for each new TTL_inner value. In the transmitting step, 215, a generated probe packet train may either be sent directly after it has been finished, or buffered in a buffer storage waiting to be sent in a sequence, train by train with a predetermined time slot in between. When a probe packet train is sent, the outer packets are time stamped, which time stamps will indicate the initial inter-packet separation IPS sent between the outer packets. Said time stamps may be used by the receiving node for estimating the IPSsent value for each received probe train.

As described above, the first sub-process in the start node may comprise the following steps:

- Generating, 210, and transmitting, 215, a probe train towards the end node, said probe train is generated with a specific size s and an initial inter-packet separation IPSsent comprising outer and inner data packets, said outer data packets enclosing the inner data packets, by setting the outer Time-To-Live, TTL_outer, value of the outer data packets equal to or higher than the number of node hops to the end node, 210;
  setting the inner Time-To-Live, TTL_inner, value of inner data packets to a value equal to or less than the TTL_outer value, and said TTL_inner value defining a sub-path;
- Checking, step 207, if the present set TTL_inner value is less than or equal to the set TTL_outer value. Alternatively, the test may be set to check if the present set TTL_inner value is less than the number of hops N, if TTL_outer is set to a number exceeding the number of hops in the data path;

Transmitting the probe trains enclosing probe train information, 215.

Further, as described above, the transmitting step, 215, of the first sub-process may comprise the time stamping of the outer packets with the separate time points when they are sent from the start node for providing possibility to estimate the initial inter-packet separation of the sent probe packet train.

As described above, a number of probe packet trains having the same TTL_outer value but different TTL_inner values are sent from the start node along the data path. The probe train having inner packets with TTL_inner=1 will lose its inner packets at the first node hop as the router in said node will stop said inner packets from passing the node. The outer packet having a TTL_outer value that is equal to or higher than the number of node hops to the end node will be forwarded to the end node. The probe train having inner packets with TTL_inner=2 will lose its inner packets at the second node hop as the router in said node will stop said inner packets from passing the node. The probe train having inner packets with TTL_inner=3 will lose its inner packets at the third node hop as the router in said node will stop said inner packets from passing the node, and so on. Thus, the probe train having inner packets with TTL_inner=k will lose its inner packets at the k:th node hop as the router in said node will stop said inner packets from passing the node. The probe train will have a first probe rate $u_1$ before the node that drops the inner packets and a second probe rate $u_2$ after the loss of inner packets. The first probe rate $u_1$ may be selected by performing a number of tests sending the probe packet trains with packets having the same TTL value set to a value that is equal to or higher than the number of hops to the end node, which will cause that all packets in the train normally will arrive to the end node, if not packet loss will occur along the path. The probe trains may be sent with different probe rate u checking for an increased inter-packet separation IPSreceived at the end node compared to the sent inter-packet separation IPSsent. The increased inter-packet separation indicates as described with reference to FIG. 4 that the probe train's probe rate exceeds the available bandwidth in at least one of the links of the probed data path. Said test is not indicating which of the links that is the tightest. According to the present invention, this problem is solved by using a probe rate, u, for a number of hops, i.e. router hops or links, and see if an increased inter-packet separation IPSreceived at the end node compared to the sent inter-packet separation IPSsent. Thus, by comparing the received inter-packet separation IPSreceived between consecutive probe packet trains having been sent with different TTL_inner values, it will be possible to detect between which consecutive sub-paths the tightest link is situated, as the difference between two consecutive sub-paths are one hop and/or one link. The present method therefore provides a possibility to locate the tightest link of a data path by, in the start node, generating N probe packet trains which TTL_inner values are varied from 1, 2, 3, . . . , k, . . . , N if the data path comprises N hops, and by detecting, estimating and recording the inter-packet separation IPSreceived for each received train of probe packets.

Embodiments of the present invention therefore comprises a determining step, 220, in which a received probe train's received inter-packet separation (IPS received) is determined. Said determination may be performed in the end node by a receiver unit according to one embodiment of the invention. According to another embodiment, said determination may be performed in the start node by a receiver unit. Both said embodiments will be described further down in this description. Common for these two embodiments are that the outer packets of the received probe packet train are time stamped at there different arrival in the end node. Said timestamps are used for determining the probe train's received inter-packet separation IPS received.

Said inter-packet separation value is then used in the calculation step, 225, when calculating an estimate for available bandwidth for the TTL_inner value, said estimate is calculated based on the initial train size and a difference between the initial (IPSsent) and the received (IPSreceived) inter-packet separation. The available bandwidth may preferably be calculated by means of known mathematical methods and/or algorithms for the purpose, e.g. BART, pathChirp, Spruce or Pathload. Thus, the available bandwidth is calculated for each sub-path, i.e. TTL_inner value that has been used during a probing run of the data path.

As discussed, the above described sub-path probing process could be considered to comprise a number of sub-processes that may be distributed to different nodes. The determination step, 220, may be the determination sub-process, and the calculation step, 225, as the calculation sub-process. In the following, embodiments of the present invention will be described wherein the determination process is either performed in the end node or in the start node, and wherein the calculation process is performed in the end node or in the start node.

However, as the available bandwidth is a varying function over time, and for determining more statistically correct results, a number of probing runs may be necessary to perform for the data path. Different conditions may be used and/or set in block 230 for determining if enough probing runs have been executed. One example of such a condition may be that three different probing runs over a predetermined time has to be executed, which results then will be used for identifying the tightest link in the identifying step, 235. The identification of the tightest link may be performed by comparing the estimates for available bandwidth for a number of TTL_inner values. Said values are a result of repeating the sub-path probing process by varying the TTL_inner value, 225,230. Alternatively, new probing runs with the sub-path probing process may be performed by varying the probe rate u, i.e. different probe rates selected within a predetermined probe rate interval. The selection of probe rates may be randomized, preferably within said predetermined interval.

The method can be divided into two versions, depending on whether there is access to the end node, or not.

1) If access to the end node is possible, a receiver unit and an estimator unit could be located in the end node. TTL_outer may be set such that TTL_outer>=the number of hops between the sender and the receiver. In this case, the first packet and the last packet will reach the receiver, which means that the receive time of these packets must be recorded by a receiver at the end address. To be sure that these packets will always reach the receiver, the TTL_outer value could be set to the maximum TTL value, i.e. 255, but then an additional TTL_inner value condition has to be set for restricting the number of probe trains to be generated and number of hops, e.g. TTL_inner value has to be less than or equal to the number of router hops is a suitable condition. Said embodiment is discussed further down and illustrated in FIGS. 6 and 9.

2) It is also possible to run the present method, if access to the end node is not possible. In the later case, the standard feature Internet Control Message Protocol ICMP in the routers in the in the nodes is utilized. This embodiment is discussed and illustrated in FIGS. 7 and 10. In this case, the first packet and the last packet will not reach the destination address but will be discarded by some router in the path between the sender and the receiver. If this router has Internet Control Message Protocol ICMP capabilities enabled, an ICMP time exceeded packet will be sent back to the sender for each one of these packets, and the receive time of these packets can be recorded by a receiver unit in the start node.

Figure 6:
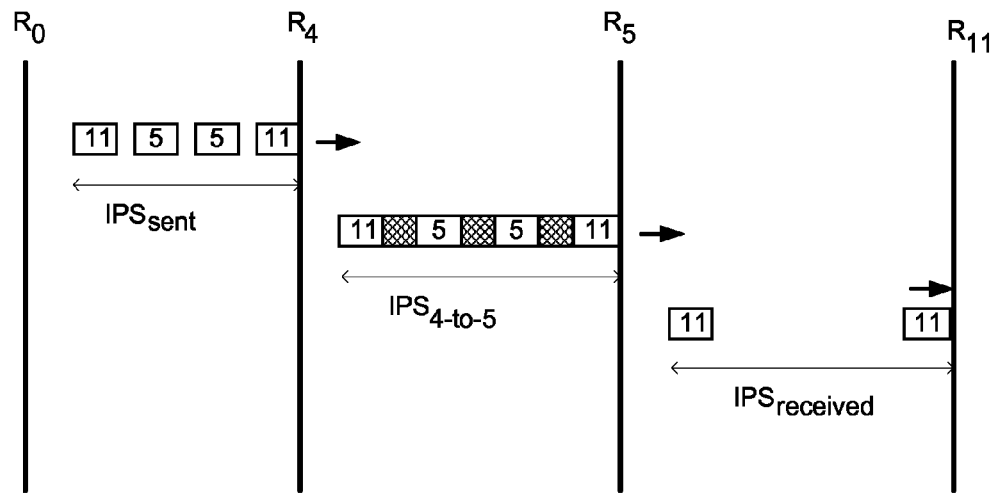
FIG. 6 is a schematic illustration of the functional principle of a first embodiment of the present invention.

An example of how a first embodiment of the invention operates is illustrated in FIG. 6. Probe packets are sent from $R_0$ to $R_{11}$ with TTL_outer=11 in the outer packets and TTL_inner=5 in the inner packets. The initial time dispersion, or inter-packet separation, between the outer packets is IPSsent.

When the probe train reaches $R_4$ other traffic may also reach this router and some of this traffic may have the next forwarding hop to $R_5$. In the figure these packets are shaded. If the total amount of traffic to be forwarded between $R_4$ and $R_5$ is larger than the available bandwidth B, packets will be buffered at R4. The buffering will cause the time dispersion, i.e. inter-packet separation, between the outer probe train packets to increase to IPS4-to-5 when reaching $R_5$. At $R_5$ all packets with TTL_inner=5 will be discarded and only the outer packets will be further forwarded to the end node $R_{11}$.

The new probe rate defined by the size of the outer packets and the time dispersion IPS4-to-5 is assumed to be less than the available bandwidth of all subsequent links up to $R_{11}$. This means that no further self-induced congestion will occur and therefore the time dispersion between the outer packets will not be changed. The received time dispersion IPSreceived, i.e. received inter-packet separation, will then be the same as IPS4-to-5.

Note that if the tight link is before R4 the sustained time dispersion will be from this link, e.g. IPS3-to-4, IPS2-to-3 or IPS1-to-2. However, also in this case this time dispersion will be associated to TTL_inner=5 for the inner packets.

The end node is provided with a receiver unit and an estimator unit, which will calculate the available bandwidth B for the sub-path $(R_0,R_5)$ using some of the initial probe train information enclosed in the received outer packets and the detected time dispersion, i.e. inter-packet separation, IPSreceived.

The method has been implemented and tested in laboratory with correct results.

Figure 7:
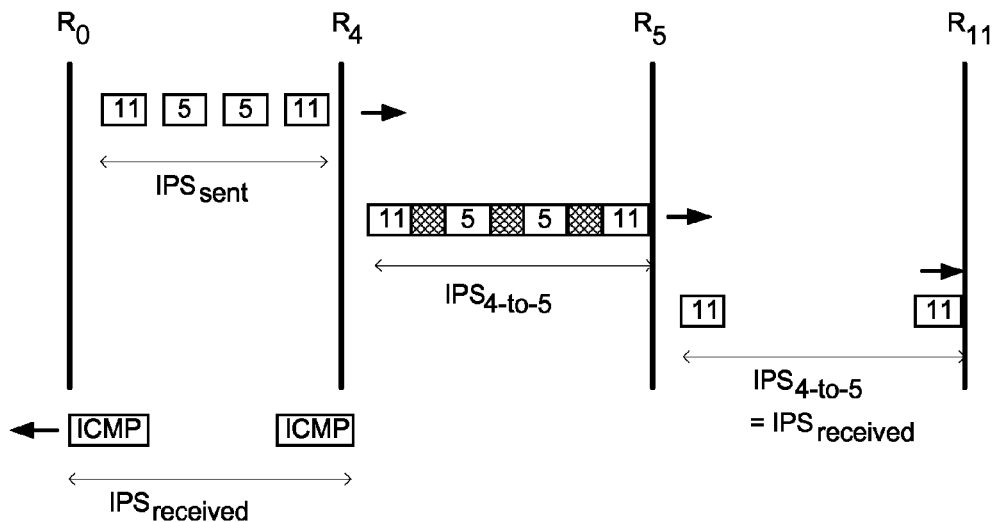
FIG. 7 is a schematic illustration of the functional principle of a second embodiment of the present invention.

Referring now to FIG. 7, there is illustrated an example of how a second embodiment of the invention operates.

A first set of probe packets, having a first inter-packet separation IPSsent, time-to-live TTL_outer=11 and TTL_inner=5 is generated in the start node $R_0$ and transmitted to an end node $R_{11}$.

When the probe train reaches $R_4$ other traffic may also reach this router and some of this traffic may have the next forwarding hop to $R_5$. In the figure these packets are shaded. If the total amount of traffic to be forwarded between $R_4$ and $R_5$ is larger than the available bandwidth, packets will be buffered at $R_4$. The buffering will cause the inter-packet separation, between the outer probe train packets to increase to IPS4-to-5 when reaching $R_5$. At $R_5$ all inner packets with TTL_inner=5 will be discarded and only the outer packets will be further forwarded to the end node $R_{11}$.

The new probe rate defined by the size of the outer packets and the time dispersion IPS4-to-5 is assumed to be less than the available bandwidth of all subsequent links up to $R_{11}$. This means that no further self-induced congestion will occur and therefore the time dispersion between the outer packets will not be changed. The received time dispersion IPSreceived, i.e. received inter-packet separation IPSreceived, will then be the same as IPS4-to-5.

At the end node $R_{11}$ the outer packets will be discarded, as TTL_outer=11. The router in the end node is provided with Internet Control message Protocol ICMP which returns an ICMP packet to the start node, by using the sending IP-address in the received data packet, informing that said data packet is dropped.

Due to the Internet Control message Protocol functionality in the router in the node, a second set of packets, typically ICMP packets having an inter-packet separation IPSreceived of the received probe packets train, is generated in the end node $R_{11}$. Typically, the second set of packets is transmitted in the form of ICMP time exceeded packets. The new set of packets (ICMP) is then transmitted back to the start node $R_0$. An estimation of the available bandwidth during said real-time operation of the data sub-path in question is produced, wherein the available bandwidth estimate is calculated based on a difference between the first and the second inter-packet separation. The inner packets that will be dropped along the data path will also result in ICMP packets sent backed to the start node. However, as the ICMP packets carry information, e.g. the IP address, about the node where the received packets were dropped/deleted, it is possible to use said information to filter the received ICMP packets for the ICMP packets of interest, e.g. the ICMP packets having the IP address of the end node. Other packets will be discarded.

The available bandwidth estimation is typically performed in real-time, but could also be performed off-line.

In other words, the described second embodiment of the present invention provides a probing method for estimating data path conditions such as available bandwidth using support only from the probe packet train start node. Typically, the start node transmits probe packets with a time-to-live flag TTL_inner lower than the number of hops to the end node N. An ICMP packet is generated when TTL_outer expires. The start node receives the ICMP packets and can calculate the received inter-packet separation IPSsent and received inter-packet separation IPSreceived needed to produce an estimate of the available bandwidth.

FIG. 8 is a table comprising the result of running the sub-path probing test for a number of different TTL_inner values. The present invention also provides a method for identifying the tightest link by means of the Time-To-Live TTL parameter. It is possible to compare estimates of available bandwidths with different TTL values, assuming fairly static values of the link capacities in the path and the available bandwidth for each of these links.

The method according to the present invention described above may be used repeatedly in order to get a table of sub-path available-bandwidth estimates for the whole path. Assuming low variations in the link capacities and of the traffic intensity rates in the data path, it is also possible to deduce which link is the tight link and get the estimates for this link. Thus, for preparing a record, list, or table, wherein the TTL_inner values defining the sub-paths and available bandwidths respectively, are linked together as illustrated in FIG. 8. With reference to the flowchart in FIG. 5, the steps 205 to 235 of said method are repeated for estimating the available bandwidth of the sub-paths of the data path between a start node ($R_0$) and a end node ($R_N$) in a communications network. For finding the tightest link, following steps may be performed:

Sending a sequence of trains from the start node to the end node with TTL_inner=1 . . . N, where N is the number of router hops between start and end nodes;

Calculating an estimate for the available bandwidth for each TTL value;

Calculating the tight link by repeatedly comparing the estimate of the path available bandwidth (=available bandwidth for TTL_inner=N) with the subpath available bandwidth estimates for the other TTL_inner values, starting with TTL_inner=N−1 and going backwards. The first reached TTL_inner value whose estimated subpath available bandwidth is significantly greater than the estimated path available bandwidth defines the start of the tight link.

As an example, in FIG. 8, starting from the bottom of the table, the first reached subpath that has a significantly higher estimate of the available bandwidth than the estimated path bandwidth (=57 Mb/s) corresponds to TTL_inner=9, thus defining the tight link to be between node 9 and node 10.

If several estimates have roughly the same value as the estimate of the path available bandwidth, this indicates that the tight link impacts all these estimates. In this case, the one with the lowest TTL_inner value is selected. This TTL_inner value is the hop number between sender and end address, i.e. sender and end nodes, that determines the tight link.

The reason for looking at "roughly the same value" is that in real networks the estimates of the available bandwidth for a path may vary in time, due to random events. This means that a sequence of sub-path estimates may vary slightly even if they measure the same tight link.

From decreasing TTL_inner values in the estimate sequence it may be possible to detect other significant steps in the available bandwidth estimate. Thus, it may be possible to get estimates for links upstream of the tight link.

Note that the available bandwidth for each sub-path $P(R_0, R_{TTL})$ cannot increase with increasing TTL values, since a path cannot have a higher available bandwidth than any of its sub-paths. However, the available bandwidth might decrease with increasing TTL values, when the available link bandwidth of the extra link added to the probed path is lower than the available bandwidth of the previous links. The TTL value, after which there is no more decrease of the available bandwidth, defines the tight link, i.e. the link which has the lowest available bandwidth of the whole path, so this is the link the tight-link capacity of the path refers to.

As already indicated in the description, there are a number of embodiments of the present invention. Common for these embodiments are that there is a start node and an end node for the probe packet train. In some of the embodiments, the end node is provided with a receiver unit. In further embodiments, the end node is further comprising an estimator unit electrically connected to the receiver unit. The receiver unit will provide the estimator unit with necessary input data determined from the received probe train.

In further embodiments, the start node is provided with a sender unit, a receiver unit and the estimator unit.

Figure 9:
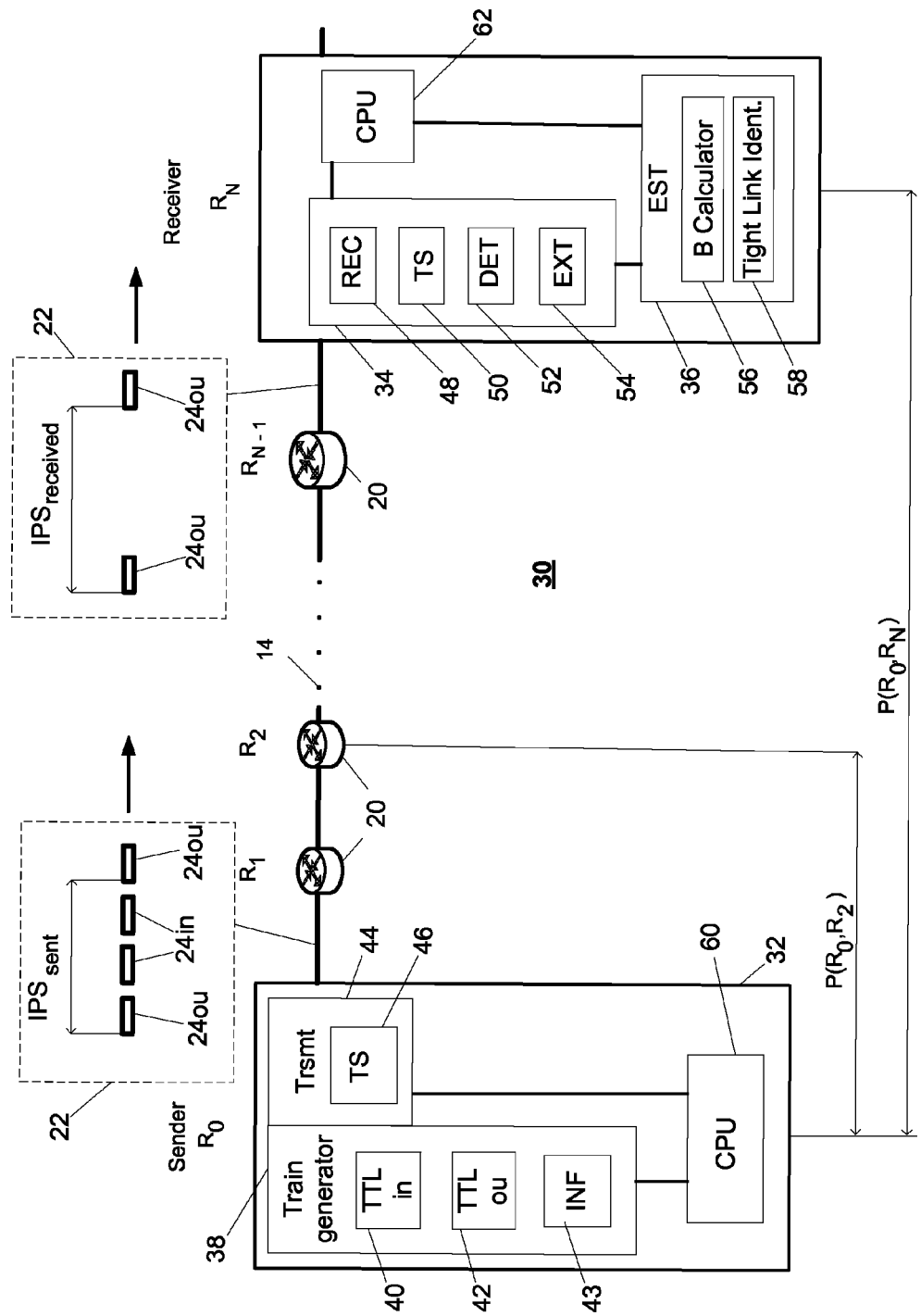
FIG. 9 is a block diagram illustrating a first embodiment of an arrangement according to the invention.
Figure 10:
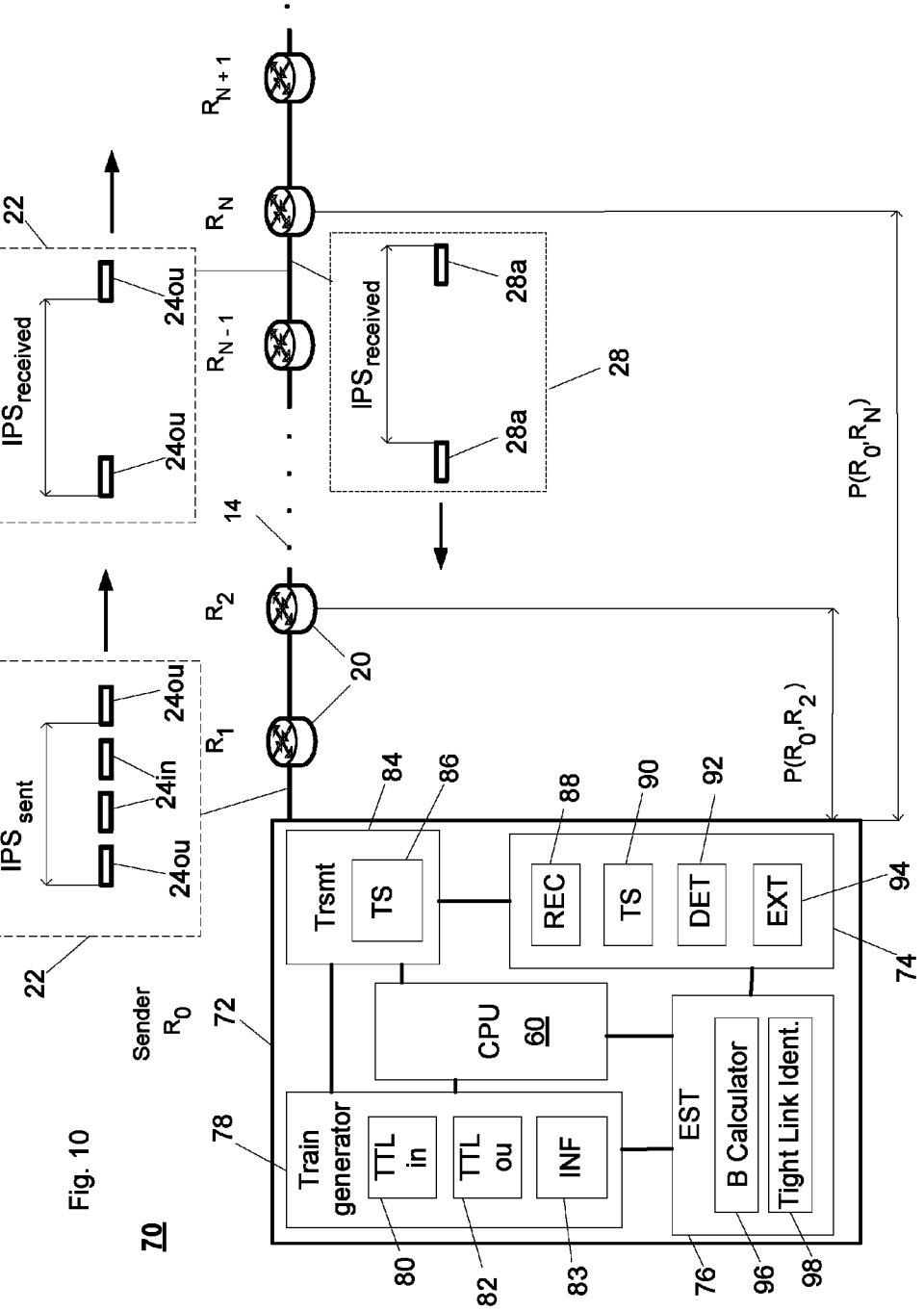
FIG. 10 is a block diagram illustrating a second embodiment of an arrangement according to the invention.

Two alternative arrangements according to the present invention are illustrated in FIGS. 9 and 10.

Said arrangements are configured for estimating the available bandwidth of sub-paths $P(R_0, R_K)$ of a data path between a start node $R_0$ and an end node $R_N$ in a communications network. Said data path 14 comprises a number of links connecting said start node with the end node via a number of intermediate nodes $(R_1, \ldots R_K, \ldots, R_{N-1})$, each node is constituting a hop and each link is having an available bandwidth during operation of said network.

FIG. 9 illustrates a first embodiment according to the invention, which embodiment now will be described in more detail.

The arrangement 30 comprises a sender unit 32, a receiver unit 34 and an estimator unit 36.

The sender unit 32 comprises a probe train generator 38 that generates probe trains 22 in accordance with step 210 of the described embodiment. Each probe train is generated with a specific size s and an initial inter-packet separation IPSsent and is comprising outer and inner data packets, said outer data packets enclosing the inner data packets. Said probe train generator 38 comprises Time-To-Live counters, one counter 40 for handling and setting the TTL_inner value of the inner packets and one counter 42 for handling and setting the TTL_outer value for the outer packets of the probe packet trains 22. The TTL_inner counter 40 is configured to set the inner Time-To-Live, TTL_inner, value of inner data packets to a value equal or less than the number of node hops, N, in a sub-path to be examined. Said TTL_inner value defines a sub-path $P(R_0, R_{TTL})$. The TTL_outer counter 42 is configured to set the outer Time-To-Live, TTL_outer, value of the outer data packets to a value equal or higher than the inner Time-To-Live (TTL_inner) value.

Further, the probe train generator 38 may comprise a storage unit 43 comprising the initial probe train information used for generating probe trains 22. Some of the initial probe train information may be inserted and enclosed in the packets 24 of the probe trains 22.

The sender unit 32 is also comprising a transmitter 44 for transmitting each generated probe packet train towards the end node defined by its IP address, as described in step 215 of the invented method. The transmitter also comprises time stamping means 46 for time stamping the sent data packets at the time point of their separate sending. The probe train generator 38 and the transmitter unit 44 may be controlled by a computer device CPU 60.

The receiver unit 34 comprises a packet receiver block 48 for receiving data packets of any kind, e.g. User Data Protocol UDP packets, Internet Control Message Protocol IMCP packets, etc., via the data path. It further comprises time stamping means 50 for time stamping the received data packets at the time point of their separate arrivals. Further, the receiver unit 34 is equipped with determining means 52 adapted for determining the received probe train received inter-packet separation IPS received. The receiver unit 34 may further include an extraction unit 54 that extracts the time stamp information and the probe train information from the received probe packets 24. The receiver unit 34 is according to this embodiment configured to perform step 220 of the above described method.

The estimator unit 36 is according to this embodiment configured to perform steps 225, 230 and 235 of the above described method. The estimator unit 36 is configured for calculating an estimate for available bandwidth for the TTL_inner value, said estimate is calculated based on the initial train size and a difference between the initial IPSsent and the received IPS received inter-packet separation. Typically, an available bandwidth calculation unit 56 calculates the available bandwidth estimate B. The estimator unit uses for the purpose an analysis algorithm e.g. BART, pathChirp, Spruce or Pathload. The received probe train may comprise initial information involving a sending time stamp for each of said outer data packets, packet size, number of packets, TTL_inner value etc, and probe train reception information is the reception time stamp for each of said outer data packets. Unit for Identifying the tightest link 58 by comparing the estimates for available bandwidth for a number of TTL_inner values in accordance with step 235. This is done by repeating the sub-path probing procedure for a sequence of TTL_inner values, i.e. hops.

The receiver unit 34 and the estimator unit 36 may be controlled by a computer device CPU 62.

The start node $R_0$ provided with the sender unit 32 comprising the probe train generator 38 for generating probe packet trains 22 e.g. comprising User Data Protocol (UDP) probe packets, sends sequences of probe packet trains 22 through the data path 14 to the end node. The probe packet generator 38 sets by means of the counters 40, 42 the time-to-live TTL_outer flag of the outer packets 24ou to a value, e.g. the number of hops to the end node, in an IP header of the outer UDP probe packets, and the time-to-live TTL_inner flag of the inner packets to a value, e.g. the number of hops to an intermediate node which is the end node of a sub-path which available bandwidth is to be calculated, in an IP header of the inner UDP probe packets. The TTL_inner value is less than the TTL_outer.

The probe packet trains 22 having a inter-packet separation IPSsent is sent to the end node. Typically, the end node has a receiver unit and may also have a router 20.

The probe packet trains 22 traverse the network path to the end node. For each passed intermediate node the time-to-live TTL values are decreased by "1", i.e. one, according to IETF standards. Of course, in other types of networks other time-to-live TTL values may be configured in some other way. When the probe packet train 22 having a TTL_inner value corresponding to a certain sub-path $P(R_0, R_{TTL})$ arrives at the end node of the sub-path $P(R_0, R_{TTL})$, the inner probe packets 24in are dropped since time-to-live TTL_inner is set to zero, i.e. TTL_inner=0.

When the outer packets 24ou sent from the start node arrive to the end node, the receiver unit 36 in the end node time stamps the arrival of each outer packet by means of the time stamping means 50. Typically, the receiver unit further includes an extraction unit 58 that extracts said time stamp information and the probe train information, such as IPSsent, probe packet train size s and sub-path information such as TTL_inner value (=total number of hops for the inner data packets 25in), carried in the probe packets 24.

The estimation of the sub-path condition such as available bandwidth is determined based on the increase in delay due to the probe packets having experienced congestion between start and end node. The determining means 52 in the receiver unit 34 calculates a received Inter Packet Separation IPSreceived, i.e. Inter packet separation received. IPSreceived, IPSsent, and the probe packet train size s are provided as input data to the estimator unit 36 for calculating the available bandwidth. The TTL_inner value is used for relating an available bandwidth value to a certain sub-path.

The estimator unit 36 then uses an analysis algorithm, e.g. BART, pathChip, Spruce or Pathload, and provides the bandwidth estimation algorithm with inter Packet Separation parameters IPSsent and IPSreceived for estimation of the available bandwidth of the sub-path determined by the TTL_inner value, which is included in the initial probe train information.

Typically, an available bandwidth calculation unit 56 calculates the available bandwidth estimate B by means of the bandwidth algorithm. The available bandwidth estimate B is provided as an output result based on the information gathered from the received probe packet train. The invention is independent on what analysis method used, it only defines how actual probing should be done, from which the available bandwidth estimations are evaluated.

FIG. 10 illustrates a second embodiment of the invention, which embodiment now will be described in more detail.

The second embodiment relates to an arrangement for actively estimating the available bandwidth from a start node to an end node utilizing entities in the start node. This has been achieved by setting the TTL outer to the number of hops to the end node, N, and TTL inner less than or equal to TTL_outer, and wherein the sender unit is adapted for determining the received probe train's received inter-packet separation IPSreceived is performed by ICMP detection of received Internet Control Message Protocol (ICMP) time exceeded packets time generated and transmitted by an intermediate node dropping the outer packets.

In the second embodiment, the sender unit, receiver unit and the estimator unit is integrated in the start node $R_0$.

The arrangement of FIG. 10 is capable of performing the method described above described in relation to and illustrated in FIG. 5. According to some embodiments, the nodes and the data transfer path, can constitute, or form a part of, a packet-switched data network, such as the Internet, a private intranet, etc.

Further, the probe train generator 78 may comprise a storage unit 83 comprising the initial probe train information used for generating probe trains 22. Some of the initial probe train information may be inserted and enclosed in the packets 24 of the probe trains 22.

The sender unit 72 is also comprising a transmitter 84 for transmitting each generated probe packet train towards the end node by using a destination IP address of a node beyond said end node, as described in step 215 of the invented method. The transmitter also comprises time stamping means 86 for time stamping the sent data packets at the time point of their separate sending.

The receiver unit 74 comprises a packet receiver block 88 for receiving data packets of any kind, e.g. User Data Protocol UDP packets, Internet Control Message Protocol ICMP packets, etc., via the data path. It further comprises time stamping means 90 for time stamping the received data packets, in this embodiment ICMP packets, at the time point of their separate arrivals. Further, the receiver unit 74 is equipped with determining means 92 adapted for determining the inter-packet separation IPS received. The receiver unit 74 may further include an extraction unit 94 that extracts the time stamp information and the information in the received ICMP packets 28a. The receiver unit 34 is according to this embodiment configured to perform step 220 of the above described method.

The estimator unit 76 is according to this embodiment configured to perform steps 225, 230 and 235 of the above described method. The estimator unit 76 is configured for calculating an estimate for available bandwidth for the TTL_inner value, said estimate is calculated based on the initial train size s and a difference between the initial IPSsent and the received IPS received inter-packet separation. Typically, an available bandwidth calculation unit 96 calculates the available bandwidth estimate B. The estimator unit uses for the purpose an analysis algorithm e.g. BART, pathChirp, Spruce or Pathload. The received probe train may comprise initial information involving a sending time stamp for each of said outer data packets, packet size, number of packets, TTL_inner value etc, and probe train reception information is the reception time stamp for each of said outer data packets. Unit 98 identifies the tightest link by comparing the estimates for available bandwidth for a number of TTL_inner values in accordance with step 235. This is done by repeating the sub-path probing procedure for a sequence of TTL_inner values, i.e. hops.

The probe train generator 78, the transmitter unit 84, the receiver unit 88 and estimator unit 76 may be controlled by a computer device CPU 60.

The start node is provided with the sender unit 72 comprising the probe train generator 78 for generating probe packet trains 22 e.g. comprising User Data Protocol (UDP) probe packets 24*in* and 24*ou*, sends sequences of probe packet trains 22 through the data path 14 to the end node. The probe packet generator 78 sets by means of the counters 80, 82 the time-to-live TTL_outer flag of the outer packets 24*ou* to a value, e.g. the number of hops to the end node, in an IP header of the outer UDP probe packets, and the time-to-live TTL_inner flag of the inner packets to a value, e.g. the number of hops to an intermediate node RK which is the end node of a sub-path $P(R_0, R_{TTL})$ which available bandwidth is to be calculated, in an IP header of the inner UDP probe packets. The TTL_inner value is less than the TTL_outer.

The sender unit transmits probe packet trains 22 having an inter-packet separation IPSsent to the end node $R_N$. Typically, the end node is a probe packet receiving router 20 located somewhere in the data path 14, i.e. in the uplink and downlink data path of the sender unit 72 and the end node $R_N$. The end node $R_N$ is provided with means (not shown as regarded as a feature of the router 20) for generating ICMP packets for dropped packets, and an ICMP packet 28*a* is generated for each received UDP probe packet 24. The inter-packet separation between the returned ICMP packets 28*a* in the packet train 28 will be similar to the received Inter Packet Separation IPSreceived between the received outer packets 24*ou*.

The probe packet train 22 traverse the network path to the end node RN. For each node, i.e. router 20, the time-to-line TTL is decreased by one according to Internet standards. Of Course, in other types of networks other time-to-live TTL s may be configured in some other way. When the outer probe packets 24*ou* arrive at the end node, the probe packets 24*ou* are dropped since time-to-live TTL is set to zero, i.e. TTL=0. When the ICMP packets sent from the end node arrive back to the start node, the receiver unit time stamps the arrival of each received ICMP packet and calculates a second Inter Packet Separation IPSreceived, i.e. Inter packet separation received.

The receiver unit 74 in the start node time stamps the arrival of each ICMP packet by means of the time stamping means 90. Typically, the receiver unit further includes an extraction unit 94 that extracts said time stamp information.

The probe train information, such as IPSsent, probe packet train size s and sub-path information such as TTL_inner value (=total number of hops for the inner data packets 25*in*), for generating the probe packet train 22 is provided to the estimator unit 76 for estimating the available bandwidth.

The estimation of the sub-path condition such as available bandwidth is determined based on the increase in delay due to the probe packets having experienced congestion between start and end node. The determining means 92 in the receiver unit 74 calculates a received Inter Packet Separation IPSreceived, i.e. Inter packet separation received. IPSreceived, IPSsent, and the probe packet train size s are provided as input data to the estimator unit 76 for calculating the available bandwidth. The TTL_inner value is used for relating an available bandwidth value to a certain sub-path.

The estimator unit 76 then uses an analysis algorithm, typically selected from BART, pathChip or Pathload, and provides the bandwidth estimation algorithm with inter Packet Separation parameters IPSsent and IPSreceived for estimation of the available bandwidth of the sub-path determined by the TTL_inner value, which is included in the initial probe train information.

Typically, an available bandwidth calculation unit 96 calculates the available bandwidth estimate B by means of the bandwidth algorithm. The available bandwidth estimate B is provided as an output result based on the information gathered from the received probe packet train. Unit 98 identifies the tightest link by comparing the estimates for available bandwidth for a number of TTL_inner values in accordance with step 235. This is done by repeating the sub-path probing procedure for a sequence of TTL_inner values, i.e. hops.

The invention is independent on what analysis method used, it only defines how actual probing should be done, from which the available bandwidth estimations are evaluated.

Final Consideration

The method has been tested in a lab network with correct result. It has also been tested on an Internet path between Uppsala and Ericsson lab in Stockholm with results shown in FIG. 8. According to the table the path available bandwidth is 57 Mb/s and the tight link is between $R_9$ and $R_{10}$, with the capacity around 90 Mb/s.

In the Internet test it was not possible to have an exact value of the actual traffic, since there was no access to the actual links or routers in the path. However, it is possible to make some tests and calculations using some knowledge of the network in order to verify the estimated values.

In order to find out a rough value for the available bandwidth, a large, 170 MB, file from $R_0$ to $R_{11}$, was used. The average download speed was around 60 Mbit/s for two downloads. Since TCP was used, which can allocate a bit more than the actual available bandwidth, the method estimate of 57 Mbit/s seems reasonable.

In order to verify the capacity estimates, a routing path software called "Traceroute" was used to identify the intermediate routers. The link between $R_9$ and $R_{10}$, i.e the tight link, was identified as the link between the Telia network and the Ericsson lab network. The link capacity of that link was known to be 100 Mbit/s at the link layer (Ethernet). This value corresponds to around 97 Mbit/s at the IP layer, which was in line with the estimated capacity.

The invention may be implemented in digital electronically circuitry, or in computer hardware, firmware, software, or in combinations of them. Apparatus of the invention may be implemented in a computer program product tangibly embodied in a machine readable storage device for execution by a programmable processor; and method steps of the invention may be performed by a programmable processor executing a program of instructions to perform functions of the invention by operating on input data and generating output.

The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such internal hard disks and removable disks; magneto-optical disks; and CD-ROM disks. Any of the foregoing may be supplemented by, or incorporated in, specially-designed ASICs (Application Specific Integrated Circuits).

In particular, the present invention provides for fast and accurate estimation of a time-dependent condition associated with a data path, for example, a packet switched data path between two hosts or network nodes on the Internet or another IP network. The properties of the data path are sampled by transmitting probe packets in a specific pattern across the data path.

A number of embodiments of the present invention have been described. It will be understood that various modifications may be made without departing from the scope of the invention. Therefore, other implementations are within the scope of the following claims defining the invention.

REFERENCES

[1] Ekelin, S., Nilsson, M., Hartikainen, E., Johnsson, A., Mångs, J., Melander, B., Björkman, M.: Real-time measurement of end-to-end available bandwidth using kalman filtering. In: Proceedings to the IEEE/IFIP Network Operations and Management Symposium, Vancouver, Canada. (2006).
[2] Ribeiro, V., Riedi, R., Baraniuk, R., Navratil, J., Cottrel, L.: pathchirp: Efficient available bandwidth estimation for network paths. In: Passive and Active Measurement Workshop. (2003).
[3] Manish Jain and Constantinos Dovrolis, "Pathload: a measurement tool for end-to-end available bandwidth," in Passive and Active Measurement (PAM) Workshop 2002 Proceedings, Ft Collins, Colo., USA, March 2002, pp. 14-25.
[4] Strauss, Katabi, and Kaashoek. A measurement study of available bandwidth estimation tools. In Proceedings of the ACM SIGCOMM Internet Measurement Workshop, Miami, USA, 2003.

The invention claimed is:

1. A method for estimating the available bandwidth of sub-paths of a data path between a start node ($R_0$) and an end node ($R_N$) in a communications network, said data path comprising a number of links connecting said start node with the end node via a number of intermediate nodes ($R_1, \ldots, R_{N-1}$), each node constituting a hop and each link having an available bandwidth during operation of said network, the method comprising:
Generating and transmitting a probe train towards the end node, said probe train generated with a specific size (s) and an Initial (IPSsent) inter-packet separation comprising outer and Inner data packets, said outer data packets enclosing the inner data packets, by
setting an outer Time-To-Live (TTL_outer) value of the outer data packets equal to or higher than the number of hops to the end node; and
setting an inner Time-To-Live (TTL_inner) value of inner data packets to a value equal to or less than the TTL_outer value, wherein said TTL_inner value defines a sub-path;
Determining the sent probe train's received Inter-packet separation (IPSreceived); and
Calculating an estimate for available bandwidth (B) for the TTL_inner value, said estimate calculated based on the initial train size and a difference between the initial (IPSsent) and the received (IPS received) inter-packet separations.

2. The method according to claim 1, wherein the probe train is transmitted with a predetermined bit rate determined by size and initial inter-packet separation, said bit rate resulting in IPSreceived>IPSsent.

3. The method according to claim 1, wherein the TTL outer is set to the number of hops to the end node, N, and wherein the determining of the received probe train's received inter-packet separation (IPS received) is performed by time stamping the outer packets at reception in the end node, and wherein TTL inner is equal to or less than the number of node hops to the end node.

4. The method according to claim 1, wherein the TTL outer is set to the number of hops to the end node, and the TTL Inner is equal to or less than the TTL outer, and wherein the determining of the received probe train's received inter-packet separation (IPS received) is performed in the start node by ICMP detection of received Internet Control Message Protocol (ICMP) time exceeded packets time generated and transmitted by the end node dropping the outer packets.

5. The method according to claim 1, further comprising:
Identifying the tightest link by comparing the estimates for available bandwidth for a number of TTL_inner values by repeating the sub-path probing process by varying the TTL_inner values.

6. The method according to claim 5, wherein the identifying step comprises:
Sending a sequence of trains from the start node towards the end node with TTL_inner=1 . . . N, where N is the number of router hops between start and end nodes;
Calculating an estimate for the available bandwidth for each TTL_inner value;
Calculating the tight link by repeatedly comparing the estimate of a path available bandwidth with the sub-path available bandwidth estimates for the other TTL_inner values, starting with TTL_inner=N−1 and going backwards, and whereas the first reached TTL_inner value whose estimated sub-path available bandwidth is significantly greater than the estimated path available bandwidth defines the start of the tight link.

7. The method according to claim 1, wherein an estimate of the available bandwidth (B) is calculated by an analysis algorithm based on a probe rate method.

8. The method according to claim 1, wherein the probe train comprises initial information relating to one or more of a sending time stamp for each of said outer data packets, packet size, and number of packets, and the probe train reception information comprises a reception time stamp for each of said outer data packets.

9. An arrangement for estimating the available bandwidth of sub-paths of a data path between a start node ($R_0$) and an end node ($R_N$) in a communications network, said data path comprising a number of links connecting said start node with the end node via a number of intermediate nodes ($R_1, \ldots, R_{N-1}$), each node constituting a hop and each link having an available bandwidth during operation of said network, the arrangement comprising a sender unit configured for generating and transmitting a probe train towards the end node, said probe train generated with a specific size (s) and an initial (IPSsent) inter-packet separation comprising outer and inner data packets, said outer data packets enclosing the inner data packets, and said sender unit being configured for:
setting an outer Time-To-Live (TTL_outer) value of the outer data packets equal to or higher than the number of hops to the end node; and
setting an inner Time-To-Live (TTL_inner) value of inner data packets to a value equal to or less than the TTL_outer value, wherein said TTL_inner value is defines a sub-path; and
a receiver unit adapted for determining the probe train's received (IPS received) inter-packet separation; and
an estimator unit configured for calculating an estimate for available bandwidth for the TTL_inner value, said estimate calculated based on the initial train size and a difference between the initial (IPSsent) and the received (IPS received) inter-packet separations.

10. The arrangement according to claim 9, wherein the sender unit is configured to transmit the probe train with a predetermined bit rate, said bit rate, size and initial inter-packet separation resulting in a IPSreceived>IPSsent.

11. The arrangement according to claim 9, wherein the TTL outer is set to the number of hops to the end node, N, and wherein the determining of the received probe train's received inter-packet separation (IPS received) is performed by time stamping the outer packets at reception in the end node, and wherein TTL inner is equal to or less than the number of node hops to the end node.

12. The arrangement according to claim 9, wherein the TTL outer is set to the number of hops to the end node, and the TTL inner is equal to or less than the TTL outer, and wherein the determining of the received probe train's received inter-packet separation (IPS received) is performed in the start node by ICMP detection of received Internet Control Message Protocol (ICMP) time exceeded packets time generated and transmitted by the end node dropping the outer packets.

13. The arrangement according to claim 9, wherein the estimator unit is configured to calculate an estimate of the available bandwidth (B) by an analysis algorithm based on a probe rate method.

14. The arrangement according to claim 9, further comprising a unit configured to identify the tightest link by comparing the estimates for available bandwidth for a number of TTL_inner values by repeating the sub-path probing process by varying the TTL_inner values.

15. The arrangement according to claim 9, wherein the probe train comprises initial information relating to one or more of a sending time stamp for each of said outer data packets, packet size, and number of packets, and the probe train reception information comprises a reception time stamp for each of said outer data packets.

* * * * *

UNITED STATES PATENT AND TRADEMARK OFFICE
CERTIFICATE OF CORRECTION

| | | |
|---|---|---|
| PATENT NO. | : 8,724,503 B2 | Page 1 of 1 |
| APPLICATION NO. | : 13/583857 | |
| DATED | : May 13, 2014 | |
| INVENTOR(S) | : Johnsson et al. | |

It is certified that error appears in the above-identified patent and that said Letters Patent is hereby corrected as shown below:

In the Specification

In Column 3, Line 31, delete "strain E;" and insert -- strain ε; --, therefor.

Signed and Sealed this
Twenty-eighth Day of October, 2014

Michelle K. Lee
*Deputy Director of the United States Patent and Trademark Office*